United States Patent
Pavithra et al.

(10) Patent No.: US 12,502,978 B2
(45) Date of Patent: Dec. 23, 2025

(54) SYSTEMS FOR OPERATING MOTORS IN ELECTRIC VEHICLES AND METHODS OF OPERATING THE SAME

(71) Applicant: Mahindra & Mahindra Limited, Tamilnadu (IN)

(72) Inventors: Sundaram Pavithra, Tamilnadu (IN); Natarajan Saravanan, Tamilnadu (IN); Siva Ethisha, Tamilnadu (IN); Arumugham Sivakumar, Tamilnadu (IN); Alocious Aneesh, Tamilnadu (IN); Krishnamoorthy Mala, Tamilnadu (IN)

(73) Assignee: MAHINDRA & MAHINDRA LIMITED, Chengalpattu (IN)

( * ) Notice: Subject to any disclaimer, the term of this patent is extended or adjusted under 35 U.S.C. 154(b) by 164 days.

(21) Appl. No.: 18/367,086

(22) Filed: Sep. 12, 2023

(65) Prior Publication Data

US 2024/0326605 A1    Oct. 3, 2024

(30) Foreign Application Priority Data

Mar. 30, 2023    (IN) .............................. 202341024254

(51) Int. Cl.
*B60L 15/20*    (2006.01)
*B60K 1/02*    (2006.01)
*B60K 17/28*    (2006.01)
*B60L 15/00*    (2006.01)

(52) U.S. Cl.
CPC ................ *B60L 15/20* (2013.01); *B60K 1/02* (2013.01); *B60K 17/28* (2013.01); *B60L 15/007* (2013.01)

(58) Field of Classification Search
CPC .... B60L 15/20; B60L 15/007; B60L 15/2045; B60L 1/03; B60L 2200/40; B60L 2200/42; B60L 2260/26; B60K 1/02; B60K 17/28
See application file for complete search history.

(56) References Cited

U.S. PATENT DOCUMENTS

| | | | |
|---|---|---|---|
| 2012/0116628 A1* | 5/2012 | Clark | B60L 3/12 701/22 |
| 2014/0265942 A1* | 9/2014 | Li | H02P 5/74 318/51 |

* cited by examiner

*Primary Examiner* — Michael J Zanelli
(74) *Attorney, Agent, or Firm* — Amster Rothstein & Ebenstein LLP

(57) ABSTRACT

In case of EVs, there may be multiple motors, corresponding number of components and connectors, cooling systems, and wiring harness for each motor for various purposes. Based on that, the components have to be packed in the limited space available in the vehicle. Embodiments herein disclose methods and systems for operating motors in electric vehicles in an independent manner using a single Variable Frequency Drive (VFD), wherein the VFD can operate based on the application requirements such as traction alone, PTO alone, traction and PTO of lesser power requirement, traction and PTO of rated power requirement and traction and PTO of more than rated power for shorter duration.

12 Claims, 3 Drawing Sheets

SYSTEMS FOR OPERATING MOTORS IN ELECTRIC VEHICLES AND METHODS OF OPERATING THE SAME

TECHNICAL FIELD

Embodiments disclosed herein relate to electric vehicles, and more particularly to operating motors in electric vehicles in an independent manner using a Variable Frequency Drive (VFD).

BACKGROUND

In case of electric vehicles (such as tractors), there may be multiple motors for various purposes, such as, traction, power take-off (PTO), hydraulics, and so on. Currently, there are individual inverters for each motor and further, there are the corresponding number of components and connectors, cooling systems, and wiring harness for each motor. Based on that, the components have to be packed in the limited space available in the vehicle.

OBJECTS

The principal object of embodiments herein is to disclose methods and systems for operating motors in electric vehicles in an independent manner using a single Variable Frequency Drive (VFD), wherein the VFD can operate based on the application requirements such as traction alone, power take-off (PTO) alone, traction and PTO of lesser power requirement, traction and PTO of rated power requirement and traction and PTO of more than rated power for shorter duration.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
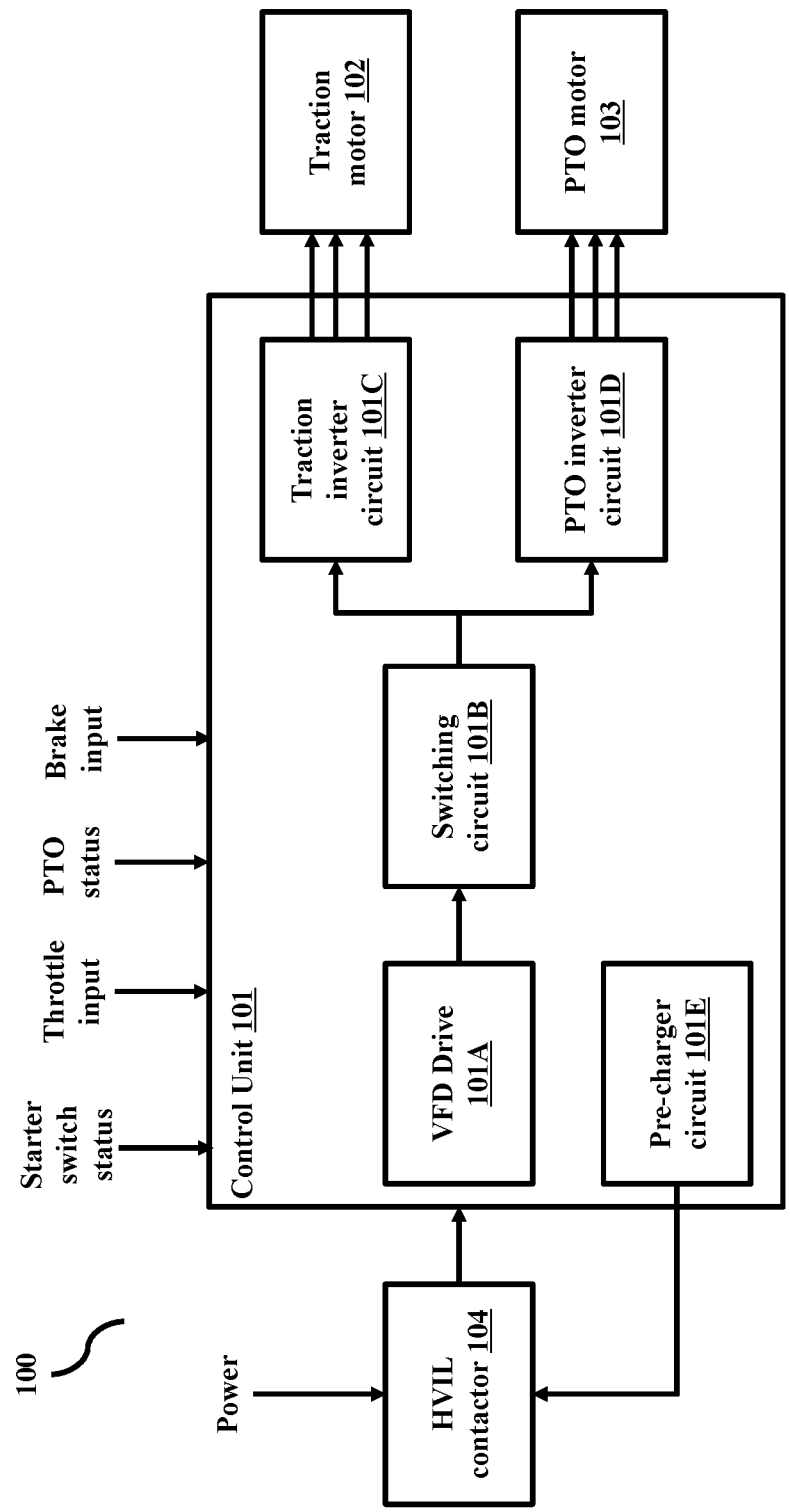
FIG. 1 depicts a system in an electric vehicle, wherein the motors in the electric vehicle is operated in an independent manner using a single Variable Frequency Drive (VFD), according to embodiments as disclosed herein.

The embodiments herein achieve methods and systems for operating motors in electric vehicles in an independent manner using a single Variable Frequency Drive (VFD). Referring now to the drawings, and more particularly to FIGS. 1 through 2B, where similar reference characters denote corresponding features consistently throughout the figures, there are shown embodiments.

Embodiments herein disclose a single integrated control unit, that integrates both traction inverter and power take-off (PTO) inverter circuits into a single unit. Because of the integration, there will be reduction in a High Voltage Interlock Loop (HVIL) contactor. Embodiments herein disclose a common pre-charger circuit. All interfaces (I/Os) can be made common for the single unit. Embodiments herein do not require a specific communication mode between the inverters, as the controller is common. Embodiments herein disclose a switching circuit to switch the input circuit for driving motors during failure. Various accessories and modules such as battery aggregates, throttle position, buck-boost converter, single contactor, and the single pre-charger can be interfaced to the single processor. Embodiments herein can have multiple switching circuits for driving multiple motors present in the vehicle.

FIG. 1 depicts a system (100) in an electric vehicle, wherein the motors in the vehicle is operated in an independent manner using a single Variable Frequency Drive (VFD). The system (100), as depicted, comprises a control unit (CU) (101), a traction motor (102), a power take-off (PTO) motor (103), and a single HVIL contactor (104). The CU (101) further comprises a VFD (101A), a plurality of switching circuits (101B), a traction inverter circuit (101C), a PTO inverter circuit (101D), and a pre-charger circuit (101E).

The HVIL contactor (104) is a high voltage switch/ contactor. The HVIL contactor (104) provides an input high voltage from at least one power source (such as a main battery) to the CU (101), once the pre-charger circuit 101E has been energized.

The VFD (101A) can control the traction motor (102) and the PTO motor (103). The VFD (101A) can control the traction motor (102) through the switching circuit (101B) and the traction inverter circuit (101C). The VFD (101A) can control the PTO motor (103) through the switching circuit (101B) and the PTO inverter circuit (101D). In a depicted example, consider that there are 5 Modes of operation for the selected system based on one or more inputs.

The VFD (101A) can receive inputs from one or more modules and/or sensors present in the vehicle. Examples of the inputs can be, but not limited to, starter switch status (ON/OFF), throttle input, PTO input, brake input (engaged/ disengaged), and so on. The starter switch status is the input from a starter switch which is operated by a starter key or START/STOP button to switch ON or switch OFF the electric power supply to the electrical and/or electronic system (vehicle loads) and the traction motor (102) of the electric vehicle. In an embodiment herein, the starter switch can be of a Normally Open (NO) type and when a user/ driver turns ON the starter switch by using the starter key or the START/STOP button, the starter switch will become Normally Closed (NC), wherein the starter switch status can be a continuous input sent by the starter switch to the VFD (101A). In an embodiment herein, the starter switch input is a low voltage input of 12/24V. In an embodiment herein, the starter switch input can be a Controller Area Network (CAN) based signal.

The throttle input can be status of the throttle level (if the throttle is being pressed by the driver, and the level/percentage to which the throttle is being pressed). In an embodiment herein, the throttle input can be provided by a low voltage mechanical to electrical signal converter (not shown). In an example herein, the low voltage mechanical to electrical signal converter can be a Throttle Position Sensor (TPS).

The PTO input can be a low voltage DC input, wherein the PTO can be controlled by a linkage operation. The PTO can be controlled from the vehicle by an operator. The operator can engage/disengage a PTO lever or a PTO switch.

Based on the inputs, the VFD (101A) can select one of a plurality of modes of operation of the traction motor (102) and the PTO motor (103). The modes of operation can be a first mode (mode 1), a second mode (mode 2), a third mode (mode 3), a fourth mode (mode 4) and a fifth mode (mode 5).

When the starter switch status is ON, the throttle input is ON (i.e., the driver is applying the throttle) & the PTO input is OFF (i.e., the vehicle is moving or starting to move), the VFD (101A) can select the first mode (mode 1) in which the VFD (101A) can turn the traction motor (102) ON by enabling the switching circuits 101B and the traction inverter circuit (101C) and keep the PTO motor (103) in the OFF condition. The traction motor 102 can operate at maximum power.

When the starter switch status is ON, there is no throttle input (i.e., the driver is not applying the throttle) and the PTO input is ON (i.e., the vehicle is in a condition that requires PTO application), the VFD (101A) can select the second mode (mode 2) in which the VFD (101A) can switch OFF the traction motor (102) and can switch ON the PTO Motor (103)) using the switching circuit (101B) and the PTO inverter circuit (101D). The PTO motor (103) can operate at the maximum power.

When the starter switch status is ON, the throttle input is ON (i.e., the driver is applying the throttle), the PTO input is ON, and the power required by the traction motor (102) and the PTO motor (103) is less than a threshold power level, the VFD (101A) can select the third mode (mode 3) in which the VFD (101A) can switch ON the traction motor (102) and the PTO motor (103) using the switching circuit (101B), and the traction inverter circuit (101C) and the PTO inverter circuit (101D) respectively. In an embodiment herein, the threshold power level can be the full capacity of the VFD (101A). In an embodiment herein, the threshold power level can be equal to the combined power of the traction motor (102) and the PTO motor (103). The power required being less than the threshold power level can be a typical load condition in field applications when there is less power demand on the load side. In this case, the traction motor (102) and the PTO motor (103) will operate, but with a reduced power (which is a power level less than the respective maximum power). Embodiments herein refer to this as mode 3.

When the starter switch is ON, the throttle input is ON (i.e., the driver is applying the throttle), PTO input is ON and the power required is greater than the threshold power level, the VFD (101A) can select the fourth mode (mode 4) in which the VFD (101A) can switch ON the traction motor (102) and the PTO motor (103) using the switching circuit (101B) and the traction inverter circuit (101C) and the PTO inverter circuit (101D) respectively. This can be a typical load condition in field applications. In this case, the traction motor (102) and the PTO motor (103) operate at full performance. The performance of the motors (102, 103) can also be based on instantaneous load requirements at the application level, wherein the VFD (101A) can perform load sharing between the motors (102, 103), so that power is maintained at the threshold power level. In an embodiment herein, the VFD (101A) can provide additional power to one of the motors (102, 103), without exceeding the threshold power level. In an example scenario, if the power requirement is more on the traction motor (102), the VFD (101A) will supply more power to the traction motor (102), but will reduce the power to the PTO motor, herein not exceeding the threshold power level.

When the starter switch status is ON, the throttle input is ON (i.e., the driver is applying the throttle), PTO input is ON and the brake input is ON, the VFD (101A) can select the fifth mode (mode 5) in which the VFD (101A) can switch ON the traction motor (102) and the PTO motor (103) using the switching circuit (101B) and the traction inverter circuit (101C) and the PTO inverter circuit 101D respectively. In mode 5, the VFD (101A) can slow down the operation of the traction motor (102), to assist braking (as the brake input is ON). The PTO Motor (103) will continue to deliver the same power as per the load requirement. On determining that the brake input is OFF, the VFD (101A) enables the traction motor (102) to continue normal performance (based on throttle input): i.e., the VFD (101A) stops slowing down the operation of the traction motor (102).

The pre-charger circuit (101E) can limit the in-rush current, on contactor switching in HV. Hence, the CU (101) can provide/energize the pre-charger circuit 101E, prior to the HVIL contactor (104) being closed.

Figure 2A:
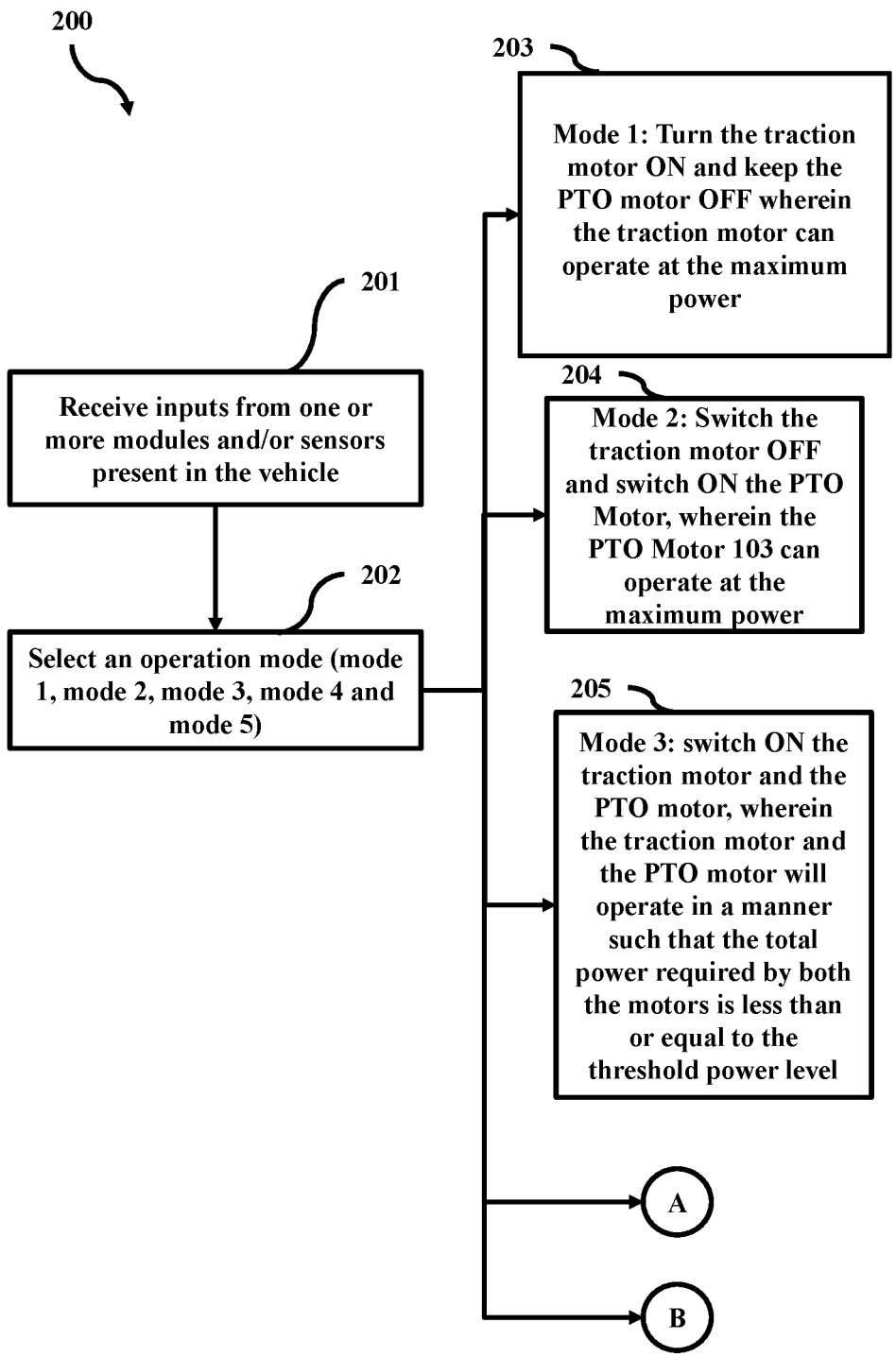
FIGS. 2A and 2B are flowcharts depicting the process of operating motors in electric vehicles in an independent manner using a single Variable Frequency Drive (VFD), according to embodiments as disclosed herein.
Figure 2B:
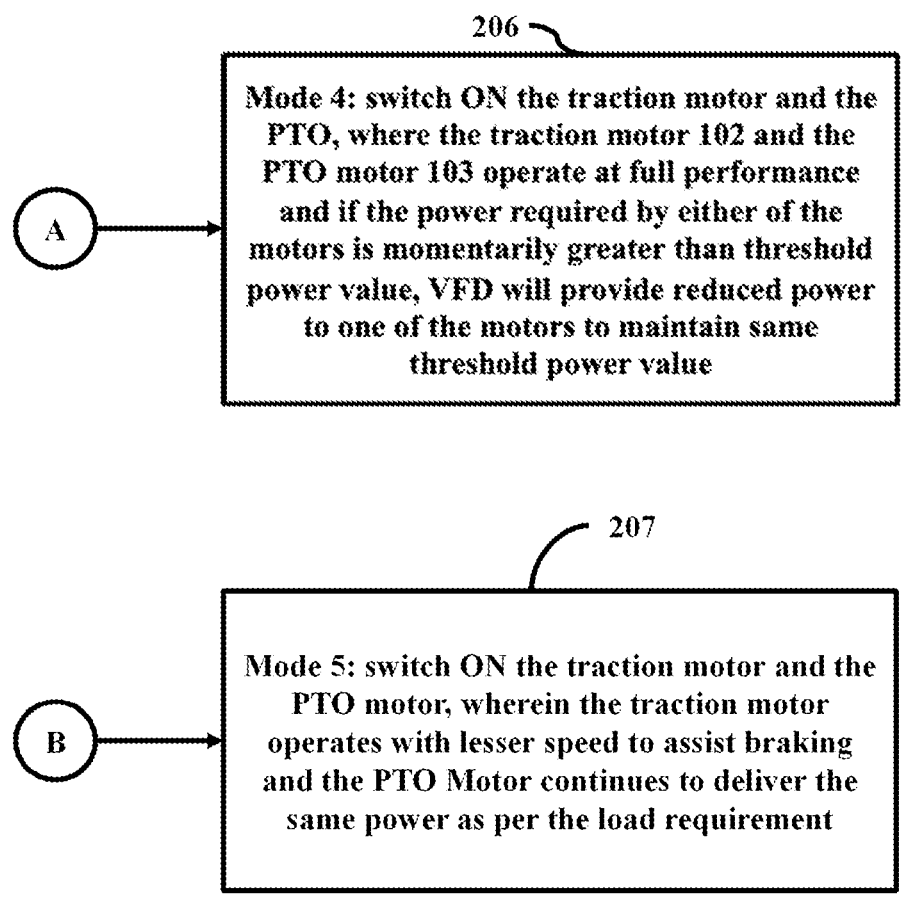

FIGS. 2A and 2B are flowcharts depicting the process (200) of operating motors in electric vehicles in an independent manner using a single Variable Frequency Drive (VFD). In step (201), the VFD (101A) receives inputs from one or more modules and/or sensors present in the vehicle, such as, but not limited to, starter switch status (ON/OFF), throttle input, PTO input, brake input (engaged/disengaged), and so on. In step (202), based on the inputs, the VFD (101A) can select one of a plurality of modes of operation of the traction motor (102) and the PTO motor (103). The modes of operation can be mode 1, mode 2, mode 3, mode 4 and mode 5.

In mode 1, the starter switch status is ON, the throttle input is ON (i.e., the driver is applying the throttle) and the PTO is OFF (i.e., the vehicle is moving or starting to move). In mode 1 (step 203), the VFD (101A) turns the traction motor (102) ON by enabling the switching circuits (101B) and the traction inverter circuit (101C) and keeps the PTO motor (103) in the OFF condition, wherein the traction motor (102) can operate at maximum power.

In mode 2, the starter switch status is ON, there is no throttle input (i.e., the driver is not applying the throttle) and the PTO input is ON (i.e., the vehicle is in a condition that requires PTO application). In mode 2 (step 204), the VFD (101A) switches OFF the traction motor (102) and switches ON the PTO Motor (103) using the switching circuit (101B) and the PTO inverter circuit (101D), wherein the PTO Motor (103) can operate at the maximum power.

In mode 3, the starter switch status is ON, the throttle input is ON (i.e., the driver is applying the throttle), the PTO input is ON, and the power required is less than the threshold power level. In step (205) (mode 3), the VFD (101A) switches ON the traction motor (102) and the PTO motor (103) using the switching circuit (101B) and the traction inverter circuit (101C) and the PTO inverter circuit (101D) respectively, wherein the traction motor (102) and the PTO motor (103) will operate in a manner such that the total input power demand from both the motors (102, 103) is less than or equal to the threshold power level.

In mode 4, the starter switch status is ON, the throttle input is ON (i.e., the driver is applying the throttle), PTO input is ON, and the power required is greater than the threshold power level. This can be a typical load condition in field applications. In step 206 (mode 4), the VFD (101A) switches ON the traction motor (102) and the PTO motor (103) using the switching circuit (101B) and the traction inverter circuit (101C) and the PTO inverter circuit (101D) respectively, where the traction motor (102) and the PTO motor (103) operate at full performance and if the power required by either of the motors is momentarily greater than the threshold power value, the VFD (101A) will provide reduced power to one of the motors, so as to maintain the same threshold power value, wherein the VFD (101A) performs load sharing between the motors (102, 103), so that power is maintained at the threshold power level.

In mode 5, the starter switch status is ON, the throttle input is ON (i.e., the driver is applying the throttle), PTO input is ON, and the brake input is ON. In step 207 (mode 5), the VFD (101A) switches ON the traction motor (102) and the PTO motor (103) using the switching circuit (101B) and the traction inverter circuit (101C) and the PTO inverter circuit (101D) respectively, wherein the VFD (101A) slows down the operation of the traction motor (102), to assist braking (as the brake input is ON) and the PTO motor (103) continues to deliver the same power as per the load requirement. The various actions in method (200) may be performed in the order presented, in a different order or simultaneously. Further, in some embodiments, some actions listed in FIG. 2 may be omitted.

Embodiments herein disclose a vehicle that uses a single processor, VFD, and PWM generator components. Embodiments herein can result in a reduction of components like contactors, precharger, control circuits, sensor interface, and so on, in the vehicle. Embodiments herein can reduce the length and size of wiring harness present in the vehicle. Embodiments herein can reduce the number of connectors present in the vehicle.

The embodiments disclosed herein can be implemented through at least one software program running on at least one hardware device and performing network management functions to control the network elements. The network elements include blocks which can be at least one of a hardware device, or a combination of hardware device and software module.

The embodiment disclosed herein describes methods and systems for operating motors in electric vehicles in an independent manner using a single Variable Frequency Drive (VFD). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g., Very high-speed integrated circuit Hardware Description Language (VHDL), another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A system (100) for operating motors in an electric vehicle, said system (100) comprising:
   a traction motor (102);
   a power take-off (PTO) motor (103);
   a High Voltage Interlock Loop (HVIL) contactor (104); and
   a control unit (CU) (101) comprising: one variable frequency drive (VFD) (101A), a switching circuit (101B), a traction inverter circuit (101C), a PTO inverter circuit (101D), and a pre-charger unit (101E), wherein the variable frequency drive (VFD) (101A) is configured to
   control a selection of a mode of operation of the traction motor (102) and the PTO motor (103), based on a starter switch status, a throttle input, a PTO input, and a brake input, wherein the mode of operation is one of a first mode, a second mode, a third mode, a fourth mode, and a fifth mode;
   control the traction motor (102) through the switching circuit (101B) and the traction inverter circuit (101C);
   control the PTO motor (103) through the switching circuit (101B) and the PTO inverter circuit (101D);
   select the fourth mode based on a detection that the starter switch status is ON, the throttle input is ON, the PTO input is ON, and power required by the traction motor (102) and the PTO motor (103) is greater than a threshold power level;
   turn ON the traction motor (102) and the PTO motor (103); and
   share load between the traction motor (102) and the PTO motor (103), so that power is maintained at the threshold power level in the fourth mode, wherein
   the threshold power level is full capacity of the VFD (101A); and
   the threshold power level is equal to a combined power of the traction motor (102) and the PTO motor (103).

2. The system (100) as claimed in claim 1, wherein the VFD (101A) is configured to:

select the first mode, based on a detection that the starter switch status is ON, the throttle input is ON, and the PTO input is OFF; and turn ON the traction motor (102) and turn OFF the PTO motor (103), wherein the traction motor (102) can operate at maximum power in the first mode.

3. The system (100) as claimed in claim 1, wherein the VFD (101A) is configured to:

select the second mode, based on a detection that the starter switch status is ON, no throttle input, and the PTO input is ON; and turn OFF the traction motor (102) and turn ON the PTO motor (103), wherein the PTO motor (103) can operate at maximum power in the second mode.

4. The system (100) as claimed in claim 1, wherein the VFD (101A) is configured to:

select the third mode based on a detection that the starter switch status is ON, the throttle input is ON, the PTO input is ON, and power required by the traction motor (102) and the PTO motor (103) is less than a threshold power level; and turn ON the traction motor (102) and the PTO motor (103), wherein the traction motor (102) and the PTO motor (103) are operating as per load requirement within the threshold power level in the third mode.

5. The system (100) as claimed in claim 1, wherein the VFD (101A) is configured to:

select the fifth mode based on a detection that the starter switch status is ON, the throttle input is ON, the PTO input is ON, and the brake input is ON; and slow down operation of the traction motor (102), and operate the PTO motor (103) as per load requirement within the threshold power level requirement, in the fifth mode.

6. The system (100) as claimed in claim 1, wherein the HVIL contactor (104) is configured to provide an input high voltage from at least one power source to the CU (101), once the pre-charger circuit (101E) has been energized.

7. A method (200) for operating motors in an electric vehicle, wherein the method (200) comprises:

selecting (202), by one variable frequency drive (VFD) (101A) of a control unit (CU) (101), a mode of operation of a traction motor (102) and a PTO motor (103) based on a starter switch status, a throttle input, a PTO input, and a brake input, wherein the mode of operation is one of a first mode, a second mode, a third mode, a fourth mode, and a fifth mode;

selecting, by the VFD (101A), the fourth mode based on a detection that the starter switch status is ON, the throttle input is ON, the PTO input is ON, and power required by the traction motor (102) and the PTO motor (103) is greater than a threshold power level;

turning ON, by the VFD (101A) the traction motor (102) and the PTO motor (103); and sharing load between the traction motor (102) and the PTO motor (103), by the VFD (101A), so that power is maintained at the threshold power level in the fourth mode, wherein the threshold power level is full capacity of the VFD (101A); and the threshold power level is equal to a combined power of the traction motor (102) and the PTO motor (103); and operating the traction motor (102) and the PTO motor (103) based on the selected mode.

8. The method (200) as claimed in claim 7, wherein the method (200) comprises:

selecting, by the VFD (101A), the first mode, based on a detection that the starter switch status is ON, the throttle input is ON, and the PTO input is OFF; and turning ON, by the VFD (101A), the traction motor (102) and turning OFF the PTO motor (103), wherein the traction motor (102) can operate at maximum power in the first mode.

9. The method (200) as claimed in claim 7, wherein the method (200) comprises:

selecting, by the VFD (101A), the second mode, based on a detection that the starter switch status is ON, no throttle input, and the PTO input is ON; and turning OFF the traction motor (102) and turning ON the PTO motor (103), by the VFD (101A), wherein the PTO motor (103) can operate at maximum power in the second mode.

10. The method (200) as claimed in claim 7, wherein the method (200) comprises:

selecting, by the VFD (101A), the third mode based on a detection that the starter switch status is ON, the throttle input is ON, the PTO input is ON, and power required by the traction motor (102) and the PTO motor (103) is less than a threshold power level; and turning ON the traction motor (102) and the PTO motor (103), by the VFD (101A), wherein the traction motor (102) and the PTO motor (103) are operating as per load requirement within the threshold power level in the third mode.

11. The method (200) as claimed in claim 7, wherein the method (200) comprises:

selecting, by the VFD (101A), the fifth mode based on a detection that the starter switch status is ON, the throttle input is ON, the PTO input is ON, and the brake input is ON; and slowing down operation of the traction motor (102), and operating the PTO motor (103), by the VFD (101A), as per load requirement within a threshold power level requirement, in the fifth mode.

12. The method (200) as claimed in claim 7, wherein the method (200) comprises providing, by a High Voltage Interlock Loop (HVIL) contactor (104), an input high voltage from at least one power source to the CU (101), once a pre-charger circuit (101E) has been energized.

* * * * *